(12) United States Patent
Leeve et al.

(10) Patent No.: US 7,717,464 B2
(45) Date of Patent: *May 18, 2010

(54) VEHICLE CHASSIS ASSEMBLY

(75) Inventors: Dion van Leeve, Greenville, OH (US); Hennie van Niekerk, Richmond, IN (US); Wayne Seaman, Greenville, OH (US); Kelvin Milne, Greenville, OH (US); Johann Eloff, Greenville, OH (US); Anton Francois, Richmond, IN (US)

(73) Assignee: Workhorse Custom Chassis, LLC, Union City, IN (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/252,220

(22) Filed: Oct. 17, 2005

(65) Prior Publication Data
US 2006/0157966 A1 Jul. 20, 2006

Related U.S. Application Data

(60) Provisional application No. 60/620,228, filed on Oct. 18, 2004.

(51) Int. Cl.
*B62D 21/00* (2006.01)
*B62D 21/12* (2006.01)
*B62D 21/11* (2006.01)

(52) U.S. Cl. .................. 280/781; 280/785; 280/788; 296/198

(58) Field of Classification Search .......... 280/781, 280/785, 788; 180/311; 296/198
See application file for complete search history.

(56) References Cited

U.S. PATENT DOCUMENTS

| | | | | |
|---|---|---|---|---|
| 2,507,980 | A | * | 5/1950 | Knapp ................ 280/124.128 |
| 2,538,839 | A | * | 1/1951 | Limberg .................... 296/198 |
| 3,593,357 | A | | 7/1971 | Oldham |
| 3,713,665 | A | * | 1/1973 | Gouirand ................. 280/6.157 |
| 4,045,075 | A | * | 8/1977 | Pulver ....................... 296/205 |
| 4,455,119 | A | | 6/1984 | Smith |
| 4,597,712 | A | | 7/1986 | Smith |
| 4,693,650 | A | | 9/1987 | Smith |
| 4,792,268 | A | | 12/1988 | Smith |
| 4,878,691 | A | | 11/1989 | Cooper et al. |
| 4,934,733 | A | | 6/1990 | Smith et al. |
| 5,016,912 | A | | 5/1991 | Smith et al. |
| 5,265,907 | A | * | 11/1993 | Tostado ..................... 280/788 |
| 5,275,430 | A | | 1/1994 | Smith |
| 5,505,278 | A | | 4/1996 | Smith |
| 5,839,750 | A | | 11/1998 | Smith |
| 6,398,251 | B1 | | 6/2002 | Smith |
| 6,428,026 | B1 | | 8/2002 | Smith |
| D485,787 | S | | 1/2004 | Smith |
| 6,733,020 | B2 | | 5/2004 | Reineck |

(Continued)

*Primary Examiner*—Paul N. Dickson
*Assistant Examiner*—Joselynn Y. Sliteris
(74) *Attorney, Agent, or Firm*—Banner & Witcoff, Ltd.

(57) ABSTRACT

A vehicle chassis assembly includes a frame assembly having a plurality of frame members connected together, a drivetrain, a suspension system, and an exhaust system. The connection of the frame members provides a low-profile configuration for reduced step height and a kick-up portion to allow ascent of steeper inclines. The frame further includes an exhaust pipe supported within a frame member and two castings bolted to removable wheel arches. The exhaust pipe has a circular cross-section that changes to a rectangular cross-section near the back of the chassis assembly.

21 Claims, 15 Drawing Sheets

U.S. PATENT DOCUMENTS

| | | | |
|---|---|---|---|
| 6,986,519 B2 * | 1/2006 | Smith | 280/124.128 |
| 7,175,202 B2 * | 2/2007 | Budica | 280/781 |
| 2001/0045719 A1 | 11/2001 | Smith | |
| 2002/0084132 A1 * | 7/2002 | Plas et al. | 180/291 |
| 2002/0105170 A1 | 8/2002 | Smith | |
| 2004/0150178 A1 | 8/2004 | Smith | |
| 2006/0151229 A1 * | 7/2006 | Leeve et al. | 180/296 |

* cited by examiner

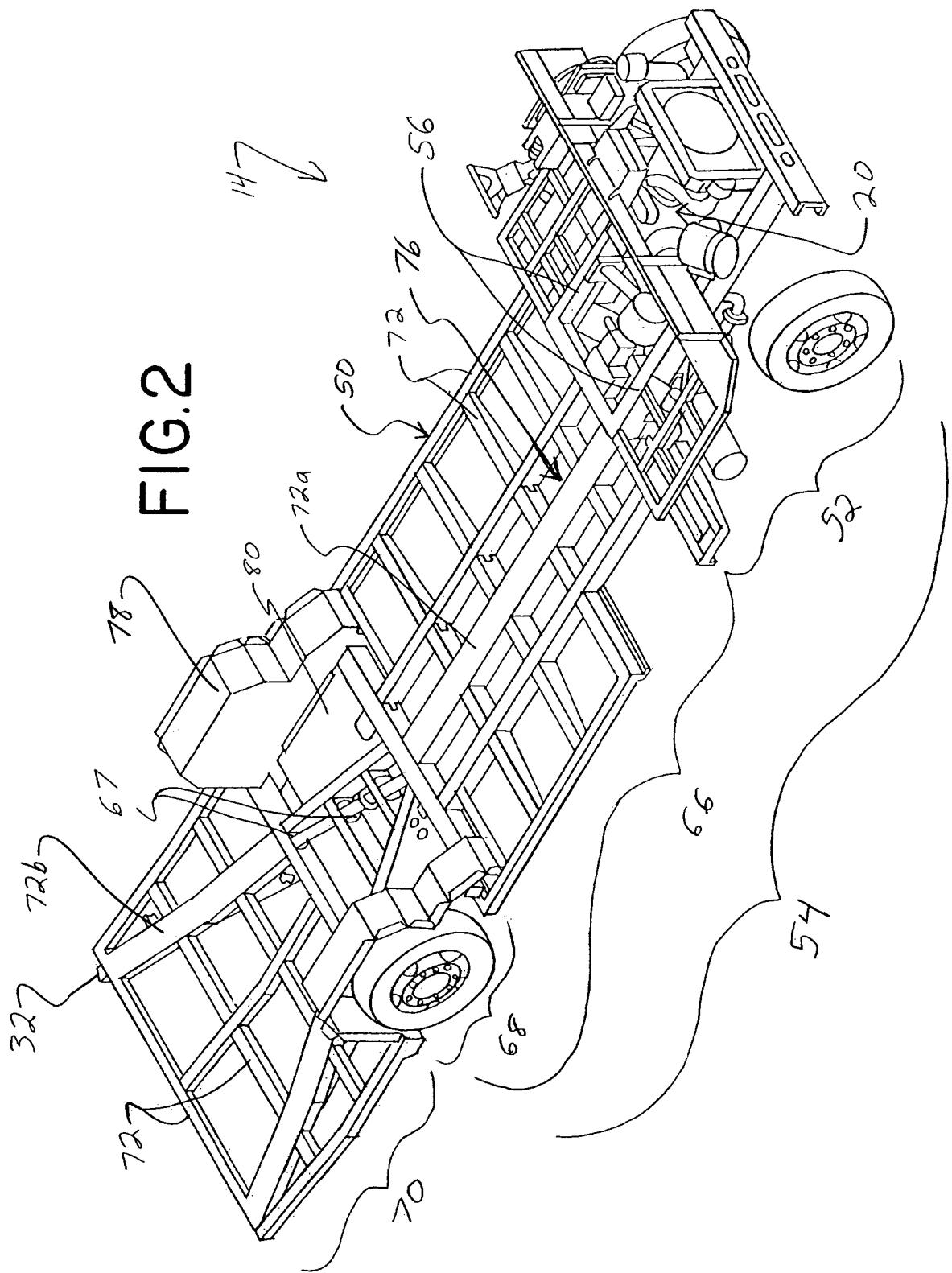

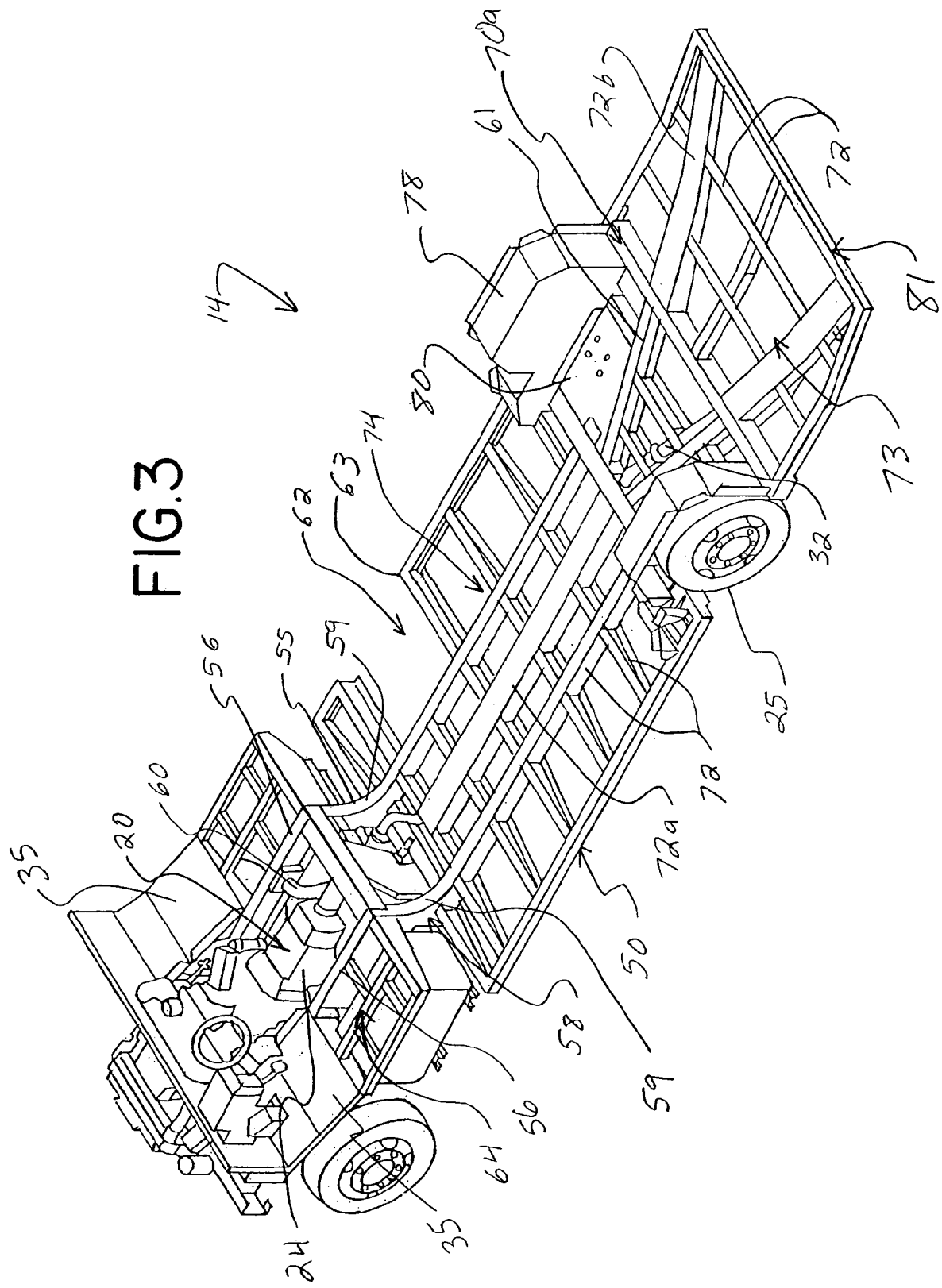

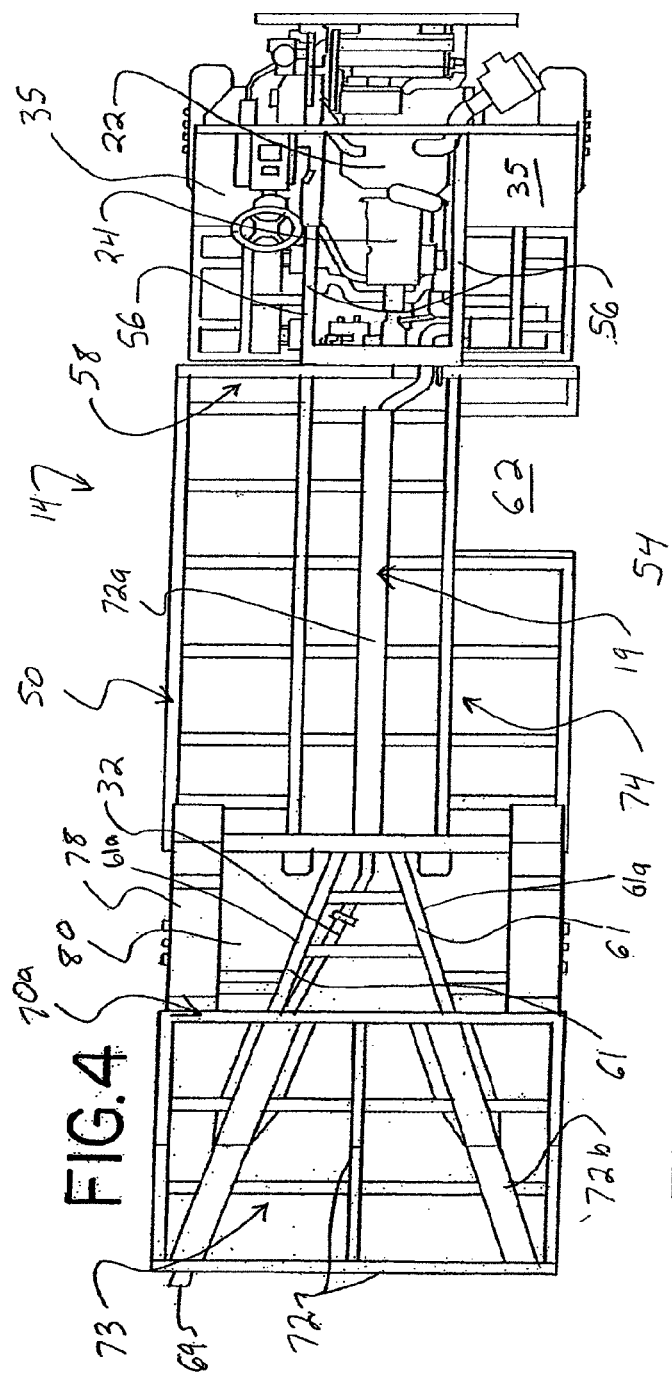
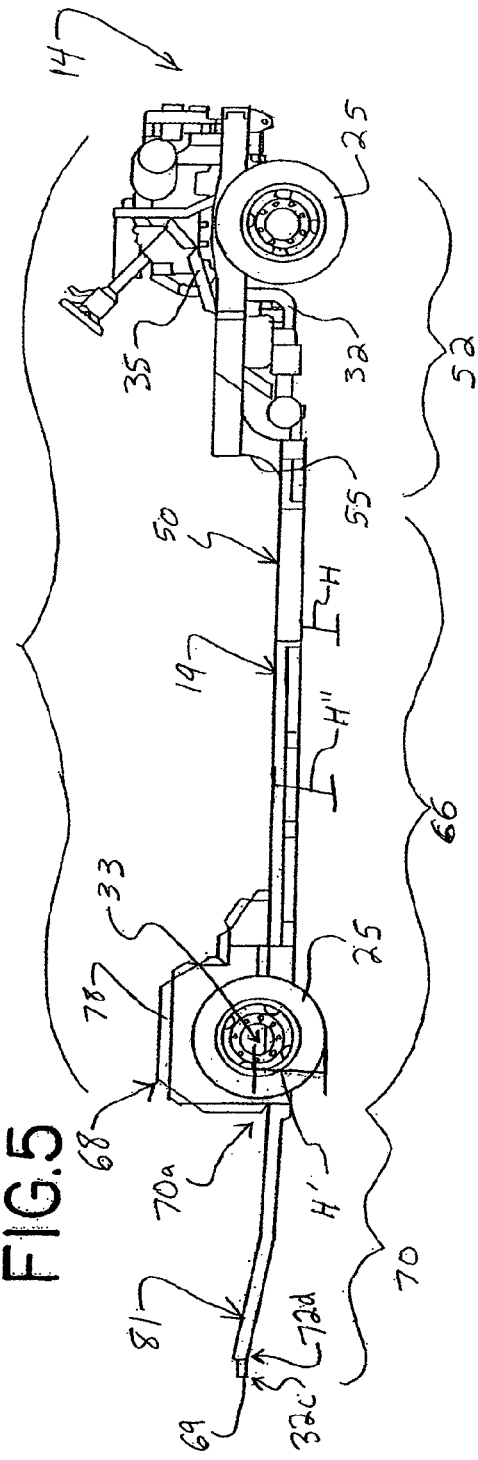

ВЕHICLE CHASSIS ASSEMBLY

CROSS-REFERENCE TO RELATED APPLICATIONS

This application claims priority to and the benefit of U.S. Provisional Patent Application Ser. No. 60/620,228, filed Oct. 18, 2004, the disclosure of which is expressly incorporated herein and made a part hereof.

TECHNICAL FIELD

The invention relates to a vehicle chassis assembly, and more particularly to a chassis assembly having a low-profile configuration, among other features.

BACKGROUND OF THE INVENTION

Vehicle chassis assemblies are well known in the art. A chassis assembly for a vehicle, in general terms, may be considered to include the frame, wheels and an engine system of the vehicle. A body of the vehicle is typically supported on the chassis assembly.

While chassis assemblies of the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a vehicle chassis assembly for different types of vehicles including, for example, delivery vehicles and buses.

According to one aspect of the invention, the vehicle chassis assembly has a frame having a plurality of frame members connected together. The connection of the frame members provides a low-profile configuration. A wheel assembly is operably connected to the frame.

According to another aspect of the invention, an engine assembly is operably connected to the wheel assembly. A body is mounted on the chassis assembly.

According to another aspect of the invention, the frame has a front section and a rear section wherein a portion of the rear section has an upwardly extending kick-up portion.

According to yet another aspect of the invention, the engine assembly has an exhaust pipe wherein the exhaust pipe is supported within a frame member. In one preferred embodiment of the invention, the frame member has a generally rectangular cross-section and the exhaust pipe has a generally rectangular cross-section dimensioned to fit within the rectangular frame member.

According to a further aspect of the invention, the frame further has a wheel arch and a plate connected to the wheel arch and frame members via bolted connections. The plate is formed in a casting process, providing enhanced strength.

According to yet another aspect of the invention, the engine assembly includes a transmission and a transfer box. The transmission is connected to the transfer box by a CV joint.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 2 is a front perspective view of one embodiment of a chassis assembly of the present invention;

FIG. 3 is a rear perspective view of the chassis assembly of FIG. 2;

FIG. 4 is a top view of the chassis assembly of FIG. 2;

FIG. 5 is a side view of the chassis assembly of FIG. 2;

DETAILED DESCRIPTION

Figure 1:
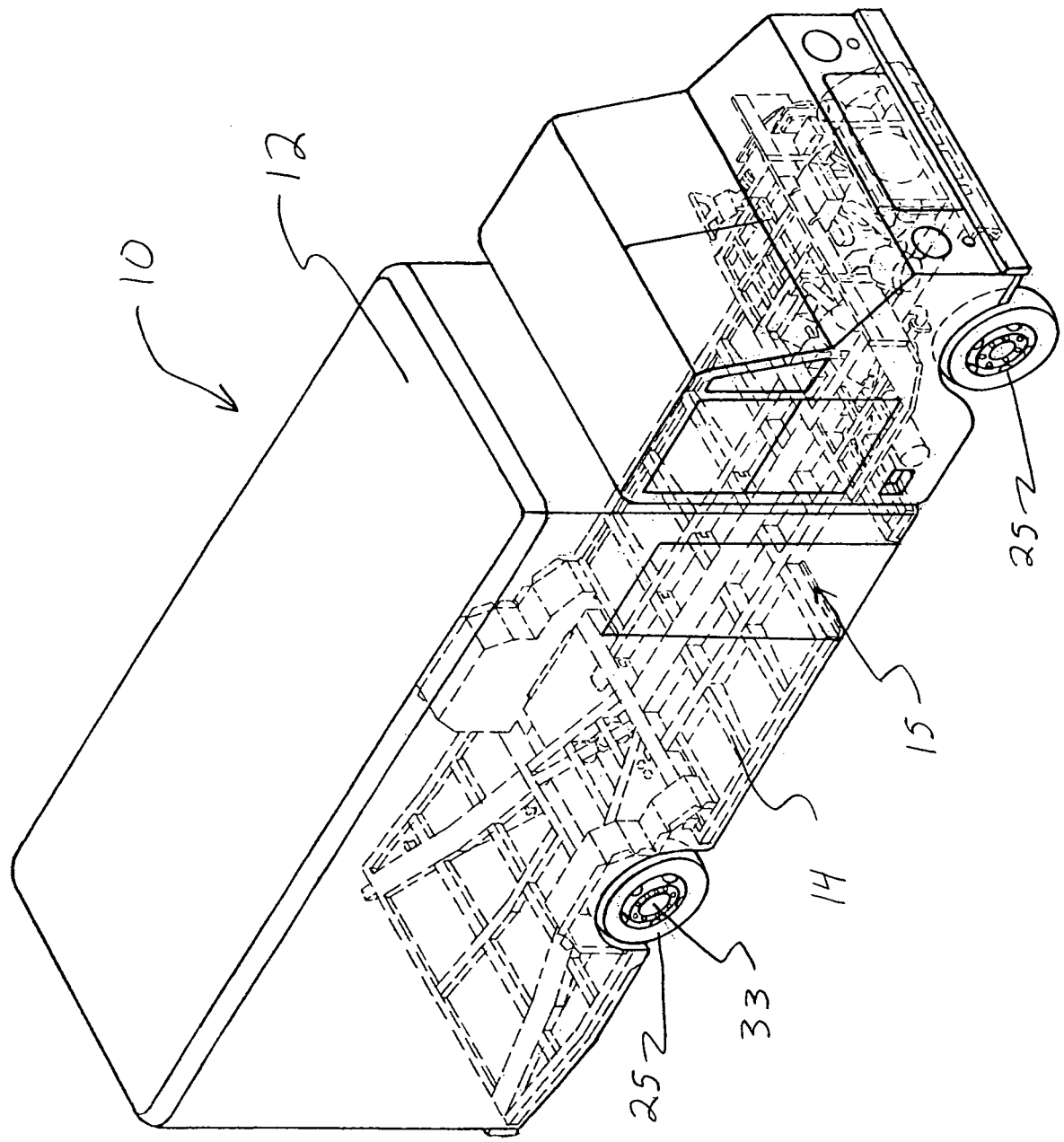
FIG. 1 is a perspective view of one embodiment of a vehicle of the present invention, showing a chassis assembly in broken lines.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now in detail to the Figures, and initially to FIG. 1, there is shown a vehicle 10 of the type suitable for use with the present invention, having a body 12 connected to a chassis assembly 14. Such a chassis assembly 14 is shown in FIGS. 2-5, and, in one preferred embodiment, includes a frame assembly 50, a wheel assembly, an engine assembly 16 that may include a drivetrain 20, an exhaust system 30, and a suspension system 40. The chassis assembly 14 may not include certain of these elements in some embodiments and may include other elements in other embodiments. The body 12 varies as desired for use with the chassis assembly 14. In one preferred embodiment, the body 12 may be a body for a storage or delivery truck, such as shown in FIG. 1. It is understood that other body types are possible, such as a bus, ambulance, or flatbed. The chassis assembly 14 is advantageously configured to provide a platform for the body 12 that is lower to the ground than prior assemblies. The distance from the step of a doorway portion 62 to the ground is known as the step height (H), illustrated in FIG. 5. The preferred chassis assembly 14 has a step height (H) that is lower than the height (H') of the rotational axes 33 of the wheels 25. Additionally, the height (H") of the top surface 19 of a middle frame portion 66 is preferably lower than the height (H') of the rotational axes 33 of the wheels 25. More generally, at least a portion of the frame assembly 50 is below the rotational axes 33 of the front and/or rear wheels 25. In the most preferred embodiment, the step height (H) of the chassis assembly 14 is 7 inches, which is lower than prior chassis designs, and is made possible through the features of the chassis assembly 14, as described herein. Accordingly, the structure of the chassis assembly 14, the frame assembly 50 in particular, provides a low-profile configuration.

Figure 11:
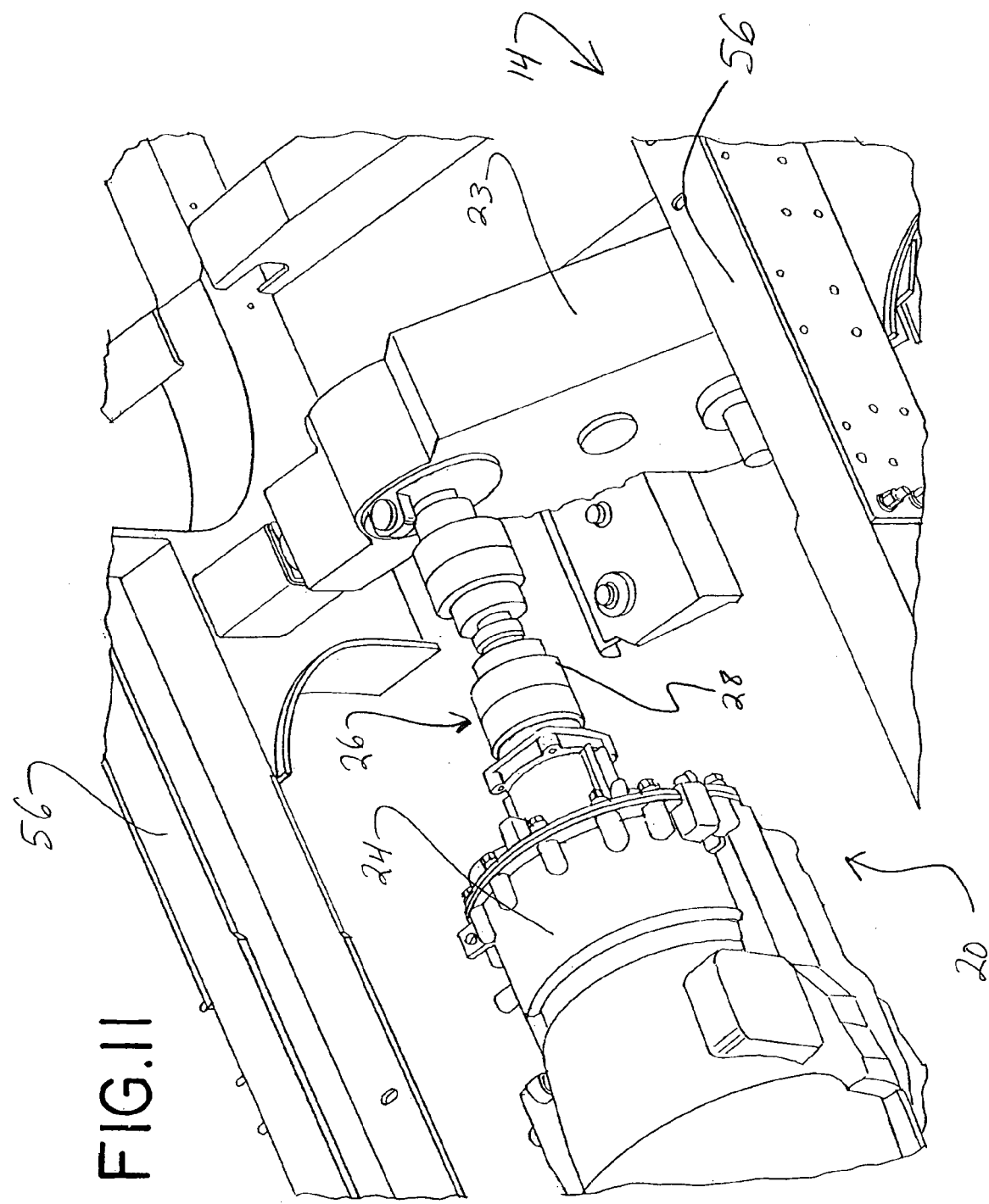
FIG. 11 is a perspective view of a transmission, a transfer case, and a CV joint of one embodiment of the chassis assembly of the present invention.
Figure 12:
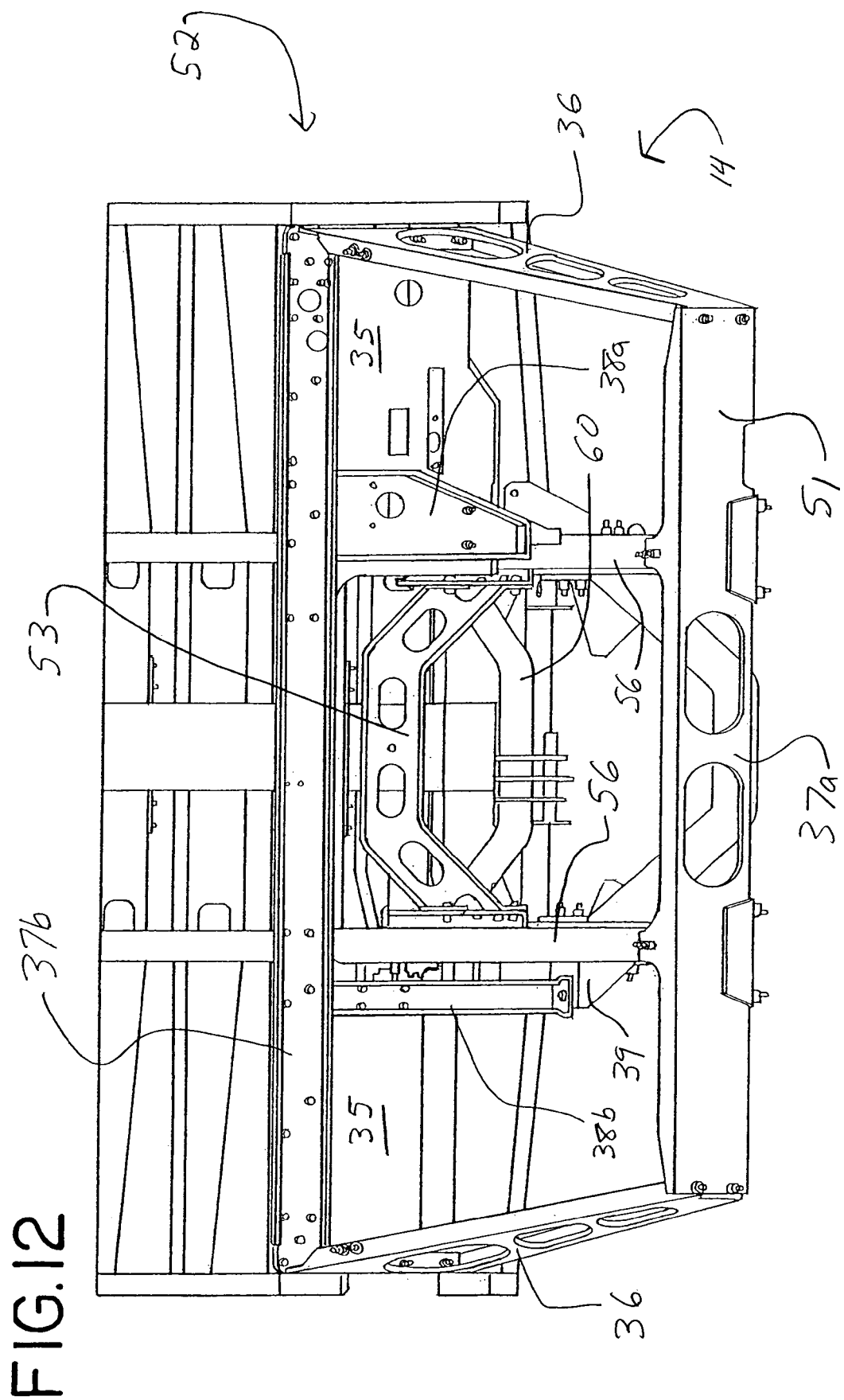
FIG. 12 is a front view of the front of one embodiment of the chassis assembly of the present invention.
Figure 13:
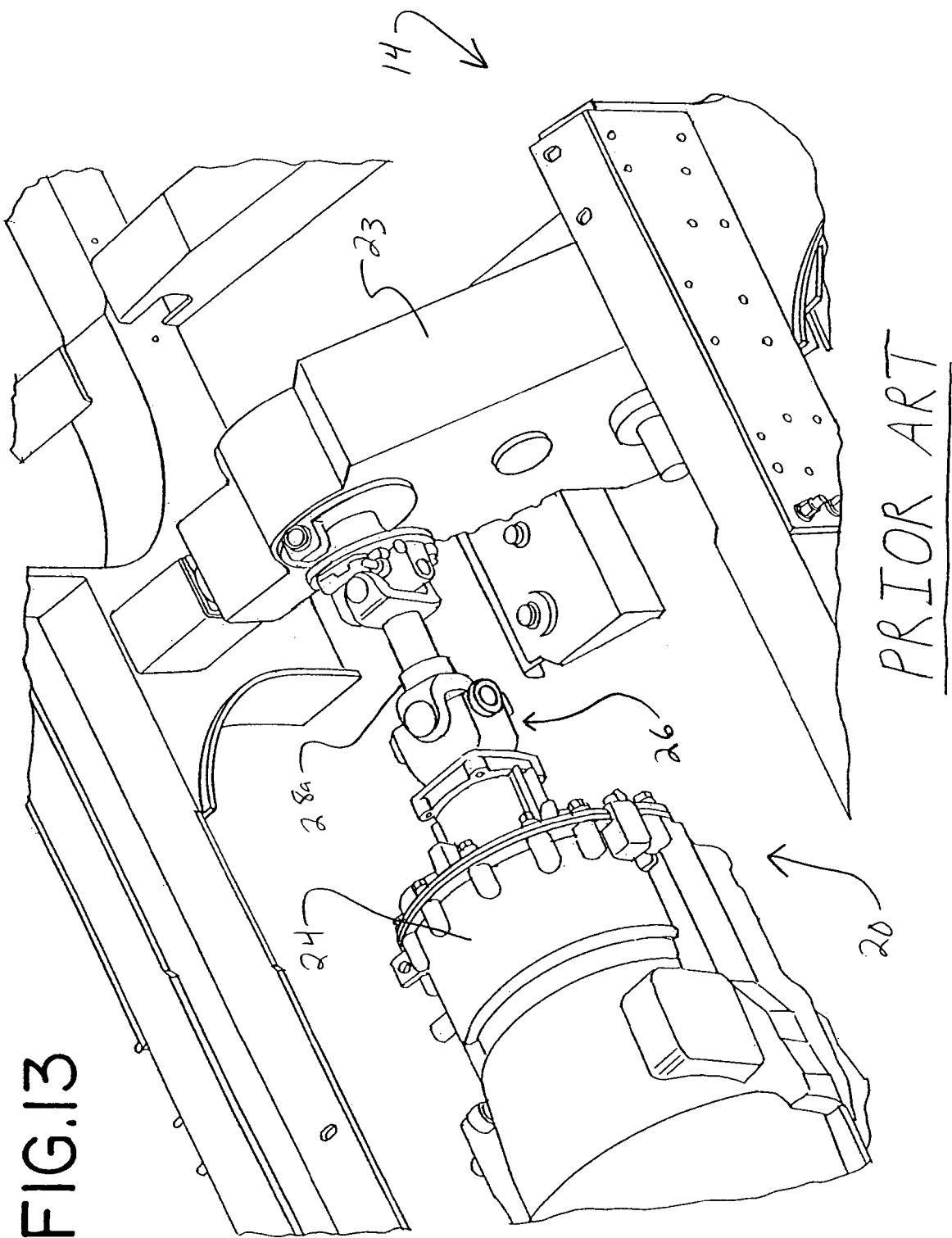
FIG. 13 is a perspective view of a prior art transmission, transfer case, and universal joint.

As shown in FIGS. 2-5, the drivetrain 20 is configured for front-wheel drive and includes an engine 22, a transmission 24, a connecting shaft 26 that includes a constant velocity (CV) joint 28, and a transfer case 23, as well as other standard components of a drivetrain for a front-wheel drive vehicle. Certain components of the drivetrain 20 are illustrated in greater detail in FIGS. 11 and 13. The drivetrain 20 is operably connected to the wheel assembly that preferably includes four wheels 25. The connecting shaft 26 connecting the transmission 24 to the transfer case 23 is relatively short in the preferred embodiment, and preferably contains the CV joint 28, as illustrated in FIG. 11. The CV joint provides consistent rotation speeds at different shaft angles. Prior art prop shafts use U-joints 28a or other connections, as shown in FIG. 13, and must be exactly aligned (i.e. 0° misalignment) to prevent barreling and/or vibration of the prop shaft. The CV joint 28 enables the connecting shaft to spin without barreling or vibration at angles up to 8° misalignment of the connecting shaft 26. Thus, the CV joint 28 allows an easier connection between the transmission 24 and the transfer case 23 as exact alignment is less of a concern.

As generally seen in FIGS. 2-5, the frame assembly 50 provides a low profile configuration and includes a first frame portion 54 and a second, rear frame portion 70. The first frame portion 54 includes a front frame portion 52 and a middle frame portion 66, which are connected via a neck portion 58. The middle frame portion 66 also includes a rear wheel portion 68. It is understood that the first frame portion 54 may be an integral structure wherein a portion of the integral structure is defined as the front frame portion 52 and a portion of the integral structure is defined as the middle frame portion 66. The frame assembly 50 is constructed primarily of frame members 72. The frame members 72 are preferably metal beams that may have a variety of different shapes, such as I-sections, C-sections, L-sections, hollow tubing, or any other known structural beam shape. The preferred embodiment contains a combination of C-beams, L-beams, and rectangular hollow tubing. Because this structure does not require a pair of large C-section rails to provide a majority of the support as in prior art chassis assemblies, the chassis assembly 14 can operate closer to the ground, thus providing a low profile design. Most preferably, this arrangement of the frame assembly 50 allows the step height (H) of the chassis 14 to be lower than the height (H') of the rotational axes 33 of the wheels 25.

As illustrated in FIGS. 2-4, 10, and 12, the front frame portion 52 includes main frame members 56, cross-members 60, a front platform 64, two wheel wells 35, a front structural support member 51, and a bracing member 53. The main frame members 56 and cross-members 60 provide a space and support for the engine 22 and transmission 24. A preferred embodiment of the configuration of the main frame members 56 is best illustrated in FIG. 4. This preferred main frame members 56 generally run parallel through the length of the front frame portion 52, from the neck portion 58 to the front of the chassis assembly 14. Drivetrain 20 components are preferably located in the space between the main frame members 56. In other embodiments, the main frame members 56 may be differently configured. Alternately, the frame assembly need not contain such frame members 56. The cross-members 60 and bracing member 53 are designed to be removable from the frame 50, facilitating removal of, and access to, the engine 22 and transmission 24. The front platform 64 is created by a plurality of frame members 72, and provides support for the front portion of the body 12, including a driver's seat. Additionally, it was found that prior art chassis assemblies incurred forces causing an oscillatory twisting, particularly at the front of the frame 50, due to forces involved in operation. Such twisting can lead to fatigue, damage, and failure of the frame. The front structural support member 51 and a bracing member 53 are added to counteract the twisting action on the frame 50. A preferred embodiment of the structural support member 51 and bracing member 53 are illustrated in better detail in FIGS. 10 and 12. In other embodiments, the frame assembly 50 contains no additional structural support member 51 or bracing member 53.

The bracing member 53 is preferably attached to span across the gap between the main frame members 56 and provide structural strength thereto. The bracing member 53 may be connected by any means known in the art or described herein, but is preferably connected via bolted connections. Additionally, the preferred bracing member 53 is arched to allow more room for components of the drivetrain 20. It is understood that the bracing member 53 could have a different configuration that functions to enhance the structural strength of the frame assembly 50 and counteract twisting forces thereon.

The preferred embodiment of the structural support member 51 includes two angled side members 36, two cross-members 37, and two prop members 38 depending from the top cross-member 37b. Preferably, the structural support member 51 is connected to the frame assembly 50 at several points, to greater enhance the structural stability of the assembly. The lower cross-member 37a is connected in two places to the tips of the main frame members 56. The two prop members 38 are each connected to one of the main frame members 56. One of the prop members 38a is connected directly to one of the main frame members 56. The other of the prop members 38b is connected to a small platform 39 affixed to the other main frame member 56. Additionally, each of the wheel wells 35 is connected to the structural support member 51, with connections on the side member 36, the top cross-member 37b, and the prop member 38. These connections are preferably made via bolted connections, but may be accomplished by any connection means described herein or known in the art, including welding. It is understood that the structural support member 51 can have other configurations that function to enhance the structural stability of the frame assembly 50 and counteract twisting forces thereon, and may be differently connected to the frame assembly 50.

The neck portion 58 connecting the front frame portion 52 and the middle frame portion 66 preferably comprises a goose-neck connection 55, as shown in FIGS. 3 and 5. The goose-neck connection 55 preferably includes at least one, and preferably two, curved frame members 59 extending between the frame members 72 of the front frame portion 52 and the middle frame portion 66. These curved frame members 59 begin at the upper level of the front frame portion 52 and curve downwardly to the lower level of the middle frame portion 66. Alternately, the goose-neck connection 55 may contain one or more angling members (not shown) in place of the curved frame members 59, which can accomplish a similar function. The goose-neck connection 55 provides excellent strength and durability to the connection, preventing failure which would result in separation of the frame assembly 50. Additionally, the downward curvature of the goose-neck connection 55 allows the middle frame portion 66 to be lower to the ground, relative to the front frame potion 52, decreasing the step height (H) of the vehicle 10.

As shown in FIGS. 2-5, the middle frame portion 66 is preferably constructed from a plurality of frame members 72 arranged in a grid structure 74 to create a center platform or floor 76 on the top surface 19 of the chassis assembly 14. The frame members 72 are arranged to provide a doorway portion 62. The grid structure 74 provides strength and support to frame assembly 50, to allow the frame members 72 to have a smaller vertical height, thereby making the floor of the platform 76 lower to the ground and reducing the step height (H). The preferred arrangement of the grid structure 74 is shown in FIGS. 2-4, and contains a large center frame member 72a, as well as several other frame members 72 arranged in a three-row rectangular pattern. Alternately, the arrangement of the grid structure 74 may be modified as desired. For example, the grid structure 74 may be substantially symmetrical, as in the preferred embodiment, or may exhibit little or no symmetry. The doorway portion 62 provides a gap 63 in the frame assembly 50 for the door 15 (FIG. 1) of the vehicle 10, allowing space for a fixed or movable step (not shown) or other such structure. A movable step can be lowered by means of outriggers (not shown) or other known apparatus.

The center frame member 72a is preferably a C-beam opening toward the ground, and provides both structural support for the frame 50 and protection for an exhaust pipe 32 that extends to the rear of the chassis 14. Preferably, the exhaust pipe 32 extends longitudinally through the center frame member 72a. The exhaust pipe 32 is able to run between the flanges of the center frame member 72a due to the open nature of the C-section, and thus does not drop down below the bottom of the frame 50 as in prior designs. The C-section configuration of the center frame member 72a thus protects the exhaust pipe 32 from damage. The exhaust pipe 32 may also be configured to run longitudinally through another frame member 72, or even between two frame members 72, while remaining adequately protected between the top and bottom of the frame 50. Additionally, the configuration of the exhaust pipe 32 may be adjusted if the configuration of the frame member 72 through which the exhaust pipe 32 runs is other than a C-beam.

Figure 7:
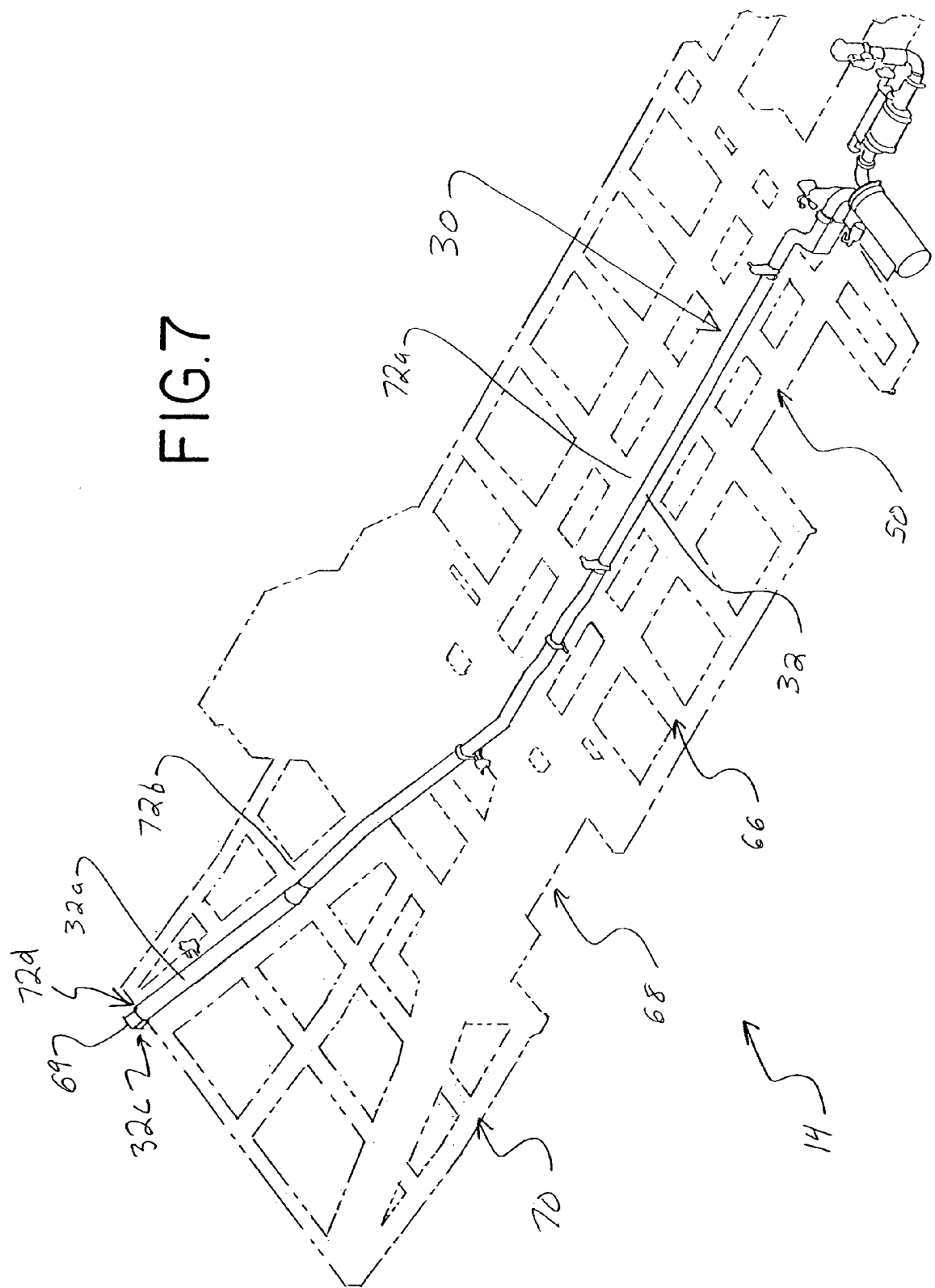
FIG. 7 is a perspective view of an exhaust system of one embodiment of a chassis assembly of the present invention, with the rest of the chassis assembly in broken lines.

Since the exhaust pipe 32 is contained within the frame 50, rather than below the frame 50, the height of the frame 50 can be lower without risking damage to the exhaust pipe 32. A number of braces 57 preferably extend across the open bottom of the center frame member 72a to hold the exhaust pipe 32 inside the center frame member 72a, as shown in FIG. 7. The exhaust pipe 32 is discussed in greater detail below. Further, other lines or conduits (brake lines, electrical wires, or air lines, for example) can also be routed to run through the center frame member 72a. Alternately, no lines, pipes, or conduits may run through the center frame member 72a, or the center frame member may be differently configured.

As described above and shown in FIGS. 2-5 and 16, the middle frame portion 66 also includes a rear wheel portion 68, which is preferably constructed from a plurality of frame members 72, and also includes two wheel arches 78 and two castings 80 fixedly connected to the frame 50. Since the castings 80 are preferably fixedly connected to the frame 50, the castings 80 do not pivot, swivel, rotate, or otherwise move noticeably with respect to the rest of the frame 50. The frame members 72 of the rear wheel portion 68 are preferably connected to the frame members 72 of the remainder of the middle frame portion 66, providing support for the rear wheel portion 68. Preferably, two frame members 61 in the rear wheel portion 68 extend at an angle proximate the castings 80. Thus, each of the castings 80 preferably has an angled edge 61a abutting one of these angling frame members 61. In the preferred embodiment, the castings 80 are fixedly attached to the wheel arches 78 and to at least one of the frame members 72.

The preferred arrangement of the castings 80 and wheel arches 78 are best illustrated in FIGS. 4-6 and 8. Each casting 80 is preferably fixedly attached to the frame members 72 surrounding the casting 80 and wheel arch 78 via bolted connections. Bolted connections create increased strength and durability relative to other connections, such as welding. Thus, the frame members 72 abutting each casting 80 are preferably provided with several bolt holes 65, and the casting is provided with several corresponding bolt holes 89. A horizontal flange 80a on one side of the casting 80 overlaps a frame member 72 and permits the casting 80 to be bolted on the top side 87 to a frame member 72. Vertical flanges 80b on other sides of the casting 80 extend below the casting 80 and permit the casting 80 to be bolted on the underside 88 to a frame member 72. Additionally, the castings 80 may be welded to the surrounding frame members 72 to further increase strength. In the preferred embodiment, shown in FIGS. 14-15, the casting 80 has a substantially planar configuration, and no component of the casting 80 extends severely out of the general planar alignment. In an alternate embodiment (not shown), one or more components, such as the vertical flanges 80b, extend farther away from the rest of the casting 80. When the casting is attached to the frame 50 as described above, the top surface 87 of the casting 80 is substantially flush with the top surface 19 of the chassis assembly 14, as illustrated in FIG. 16.

The wheel arches 78 preferably have a side wall 77 and a top surface 79, and are arched to create space in the frame assembly 50 for the back wheels 25 of the vehicle 10. Preferably, each casting 80 is integrally connected with the wheel arch 78 on the same side, further increasing the strength and durability of the frame assembly 50. Most preferably, each casting 80 is bolted to the wheel arch 78, and an angle iron 75 is added to increase the strength of the connection. This connection is best illustrated in FIG. 16. The casting 80 is provided with bolt holes 89 for this purpose. Alternately, the casting 80 may be connected with the wheel arch 78 via other known connections.

Figure 14:
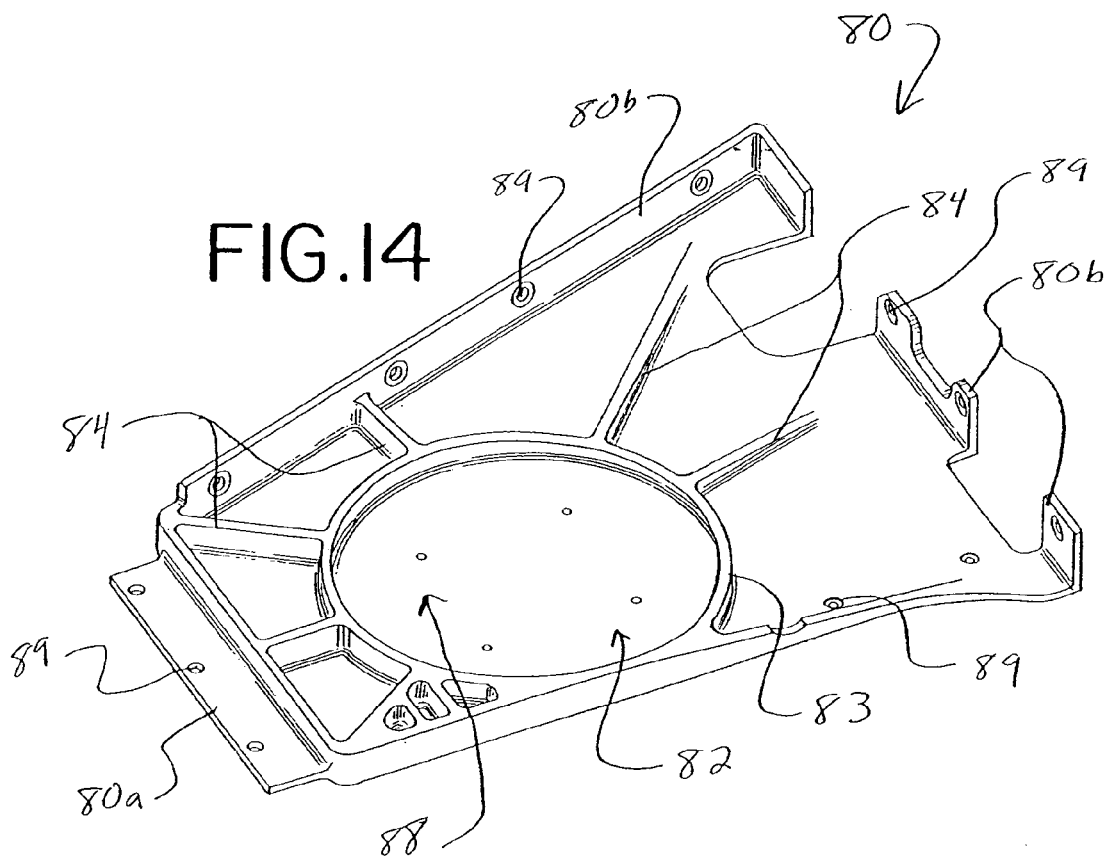
FIG. 14 is a perspective view of the underside of a casting of the chassis assembly of the present invention.
Figure 15:
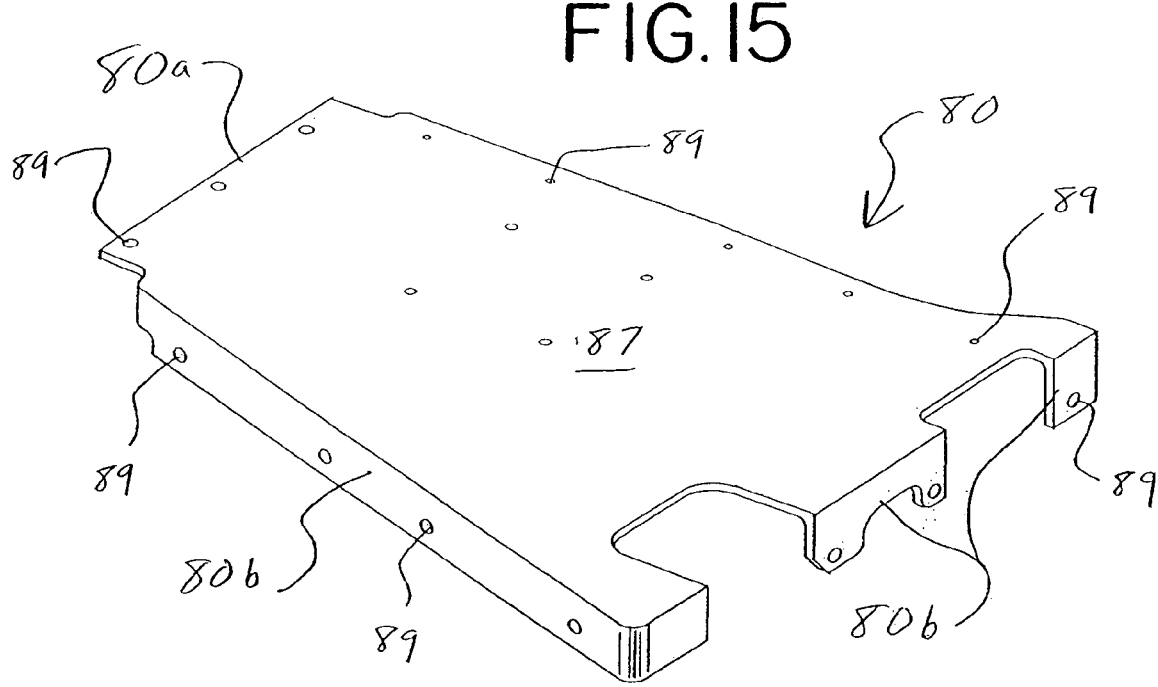
FIG. 15 is a perspective view of the topside of the casting of FIG. 14.
Figure 16:
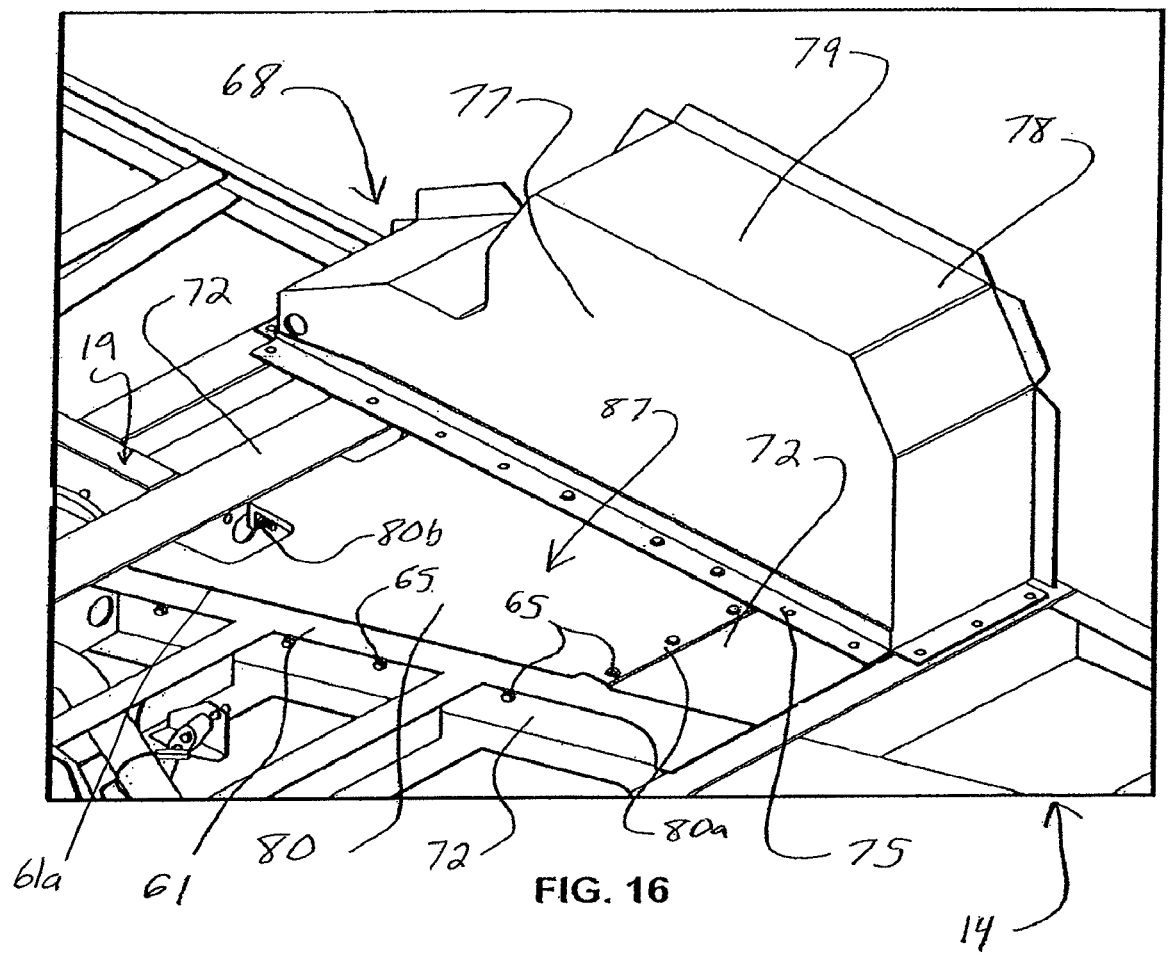
FIG. 16 is a perspective view of a portion of one embodiment of the chassis assembly of the present invention, showing a casting and a wheel arch.
Figure 17:
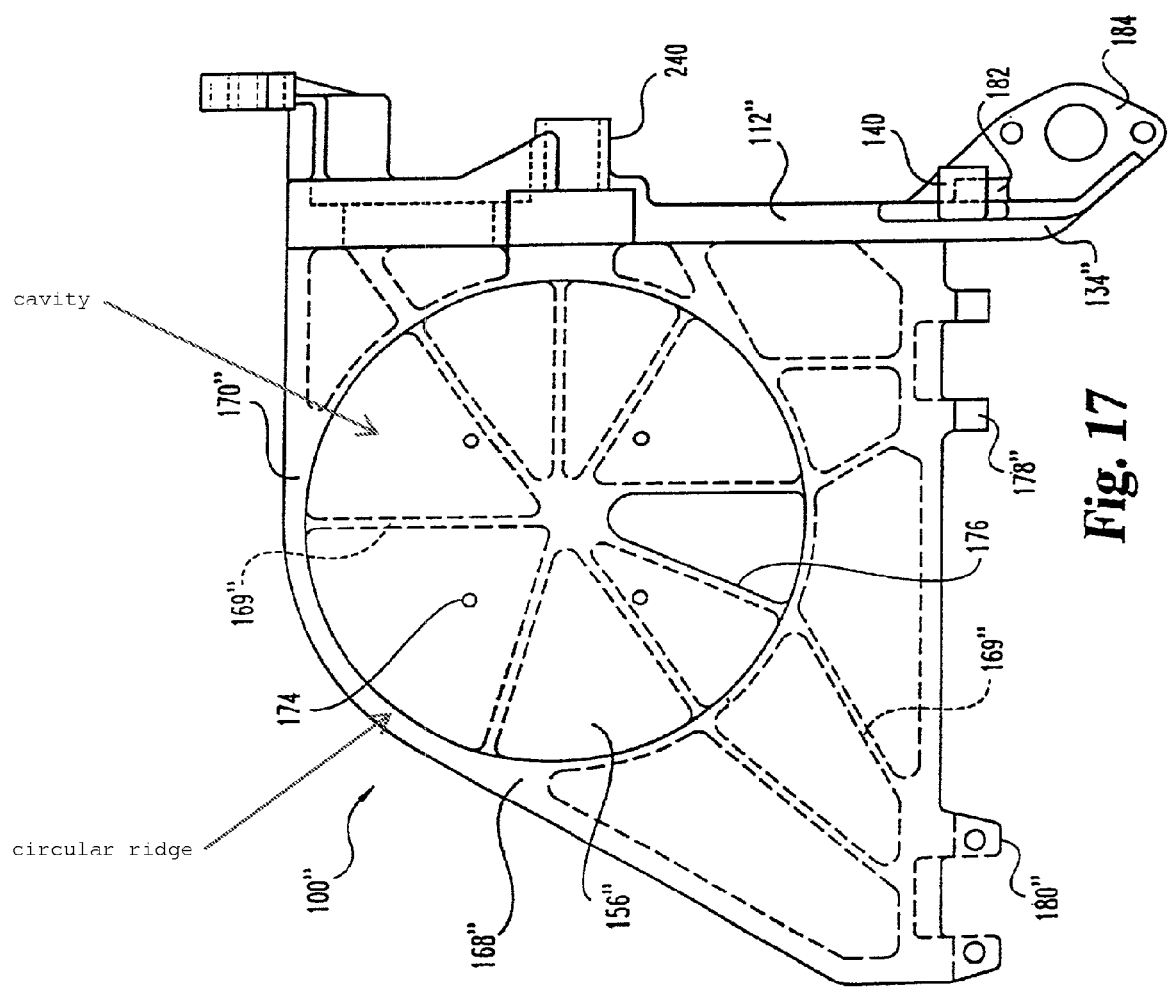
FIG. 17 is a bottom plan view of a portion of one embodiment of the chassis assembly of the present invention, showing an angling frame member and an exhaust pipe.

The castings 80 are preferably thick cast metal plates, as illustrated in FIGS. 14-15. As described below in more detail, the castings 80 provide a strong surface for abutting and supporting the air bags 42 of the suspension system. These castings 80 increase the strength and durability of the frame assembly 50, decreasing the failure rate relative to prior plates used in this application. Further, the wheel arches 78 and castings 80 are preferably removable from the frame assembly 50. The castings 80 provide improved strength as compared to metal plates that may be only welded to the wheel arches.

Figure 6:
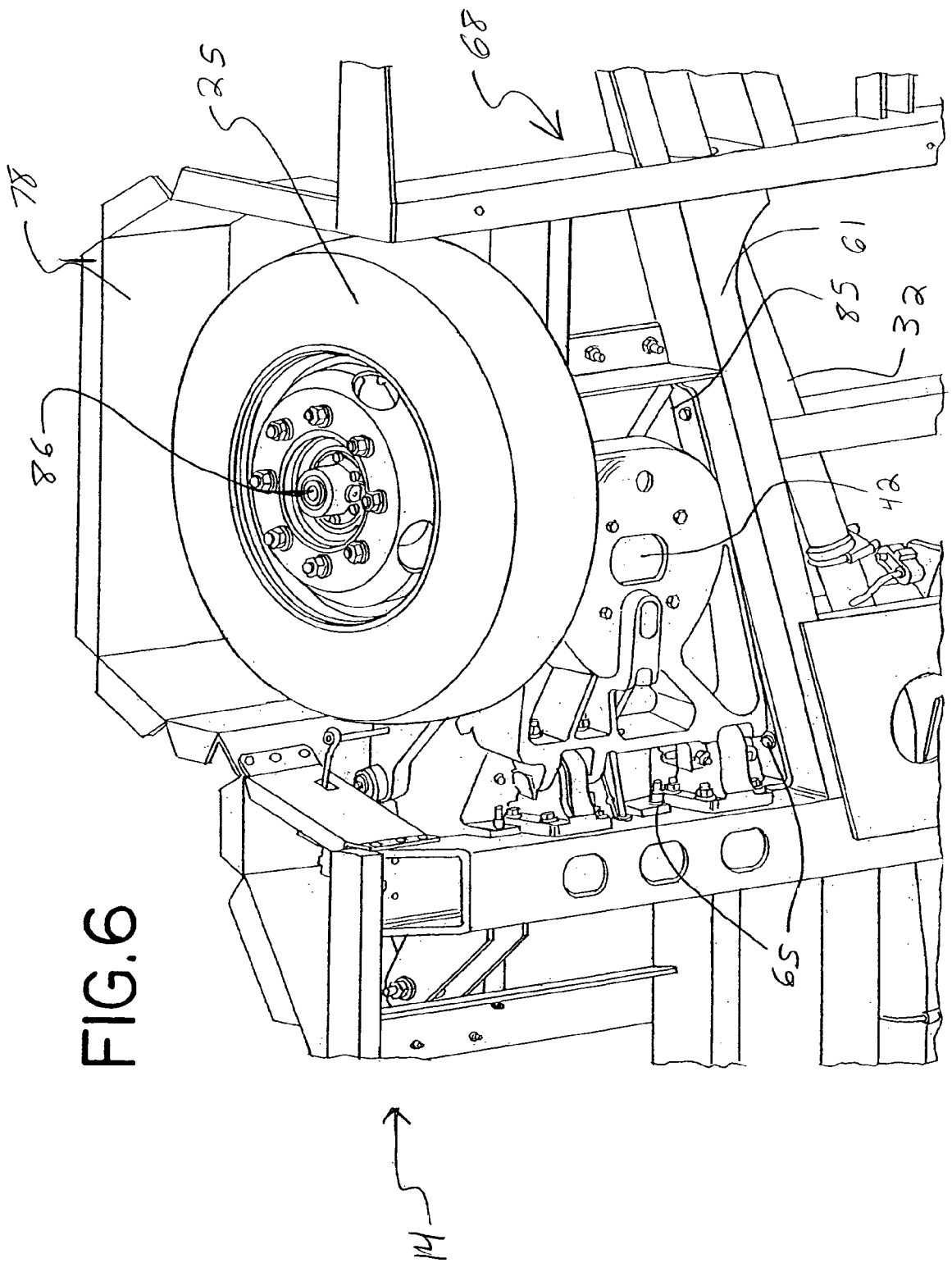
FIG. 6 is a bottom perspective view of a wheel and a portion of a suspension system of one embodiment of a chassis assembly of the present invention.

Additionally, the rear wheel portion 68 includes the rear wheels 25 of the chassis assembly 14. In the preferred embodiment, each wheel is supported by a moveable wheel support 85, as illustrated in FIG. 6. Each wheel support 85 preferably includes a spindle 86 upon which the wheel 25 rotates. Accordingly, each spindle 86 forms the rotational axis 33 of its respective wheel 25. In alternate embodiments, the rear wheels 25 may be supported by one or more axles. As described in greater detail below, air bags 42 are positioned between the casting 80 and the wheel support 85 as part of the suspension system 40 of the chassis assembly 14. Thus, the castings 80 provide surfaces for the air bags 42 to abut. Finally, if the vehicle 10 has more than two rear wheels 25, the rear portion may contain a greater number of wheel arches 78 and castings 80.

As shown in FIGS. 3-5, the rear frame portion 70 preferably is constructed from a plurality of frame members 72, and is attached to, and supported by, the middle frame portion 66 in a cantilever arrangement. The frame members 72 of the rear frame portion 70 are preferably formed in a grid structure 73 that is different from the grid structure 74 of the middle frame portion 66. As shown in FIG. 4, the preferred grid structure 73 contains two angling members 72*b* arranged to angle away from the centerline of the frame assembly 50 as they approach the rear of the vehicle 10. In other words, the angling members 72*b* preferably extend in a direction oblique to the centerline of the chassis assembly 14 and oblique to the other frame members 72 of the grid structure 73. The preferred grid structure 73 also contains several other frame members 72, arranged in a two-row rectangular pattern and welded to the sides of the angling members 72*b*. Alternately, the arrangement of the grid structure 73 may be modified as desired.

As illustrated in FIGS. 3 and 5, the rear frame portion 70 preferably includes a "kick-up" portion 81 at the back of the chassis assembly 14. The kick-up portion 81 angles slightly upwards with respect to the middle frame portion 66. Put another way, the kick-up portion 81 angles upward with respect to a level surface upon which the chassis 14 sits. Preferably, the kick-up portion 81 begins angling upward at a location remote from the juncture 70*a* between the rear frame portion 70 and the first frame portion 54. The angle of incline of the kick-up portion 81 is known as the departure angle. This arrangement permits the vehicle 10 to be driven on an incline without the rear of the chassis 14 scraping the ground, particularly when the chassis 14 is loaded onto a transport vehicle (not shown) by use of a ramp. This, in turn, permits the chassis 14 to be more easily delivered to a vehicle-assembly plant in one piece. If the kick-up arrangement is not used, the angle of incline on which the chassis 14 may be driven is more limited, due to the overhang of the rear frame portion 70. In one preferred embodiment, the rear frame portion 70 begins angling upward at the juncture 70*a* between the rear frame portion 70 and the first frame portion 54, and changes to a sharper angle closer to the rear of the frame assembly 50. In another embodiment, the entire rear frame portion 70 may angle upward at a constant angle. Prior art chassis assemblies do not include a kick-up portion. Instead, the rear portion of the chassis assembly extends generally horizontally past the rear wheels.

The angling members 72*b* are preferably beams having a "top-hat" section, i.e., a C-section with additional flanges 71 extending at right angles at the tips of the C-section, as illustrated in FIG. 4. The additional flanges 71 add strength and durability to the angling members 72*b*, and the open bottom of the top-hat shape permits the exhaust pipe 32 and other lines to run longitudinally through the angling members 72*b* to the back of the bus, similar to the center frame member 72*a*. In the preferred embodiment, a chassis harness, which supplies electrical power to the tail lights, also runs through one of the angling members 72*b*. The exhaust pipe 32 is discussed in more detail below.

The exhaust system 30 includes an exhaust pipe 32 extending from the engine 22 to the rear of the vehicle 10, illustrated in FIGS. 2-5, 7, and 17. Due to the low step height (H) of the chassis assembly 14 and overall low-profile configuration of the chassis assembly 14, damage to the exhaust pipe 32 by debris or other road conditions becomes a greater risk, as the exhaust pipe 32 is positioned closer to the ground. Accordingly, the exhaust pipe 32 preferably is supported within the frame assembly 50. Most preferably, the exhaust pipe 32 runs through the inside of one or more frame members 72 on its path from the engine 22 to the rear of the vehicle 10, as described above. The exhaust pipe 32 has an outlet 69 at a distal end 32*c*, which is preferably located at the rear of the vehicle 10. As illustrated in FIGS. 2, 3, and 7, the exhaust pipe 32 runs longitudinally through the center frame member 72*a* of the middle frame portion 66 and passes diagonally through holes 67 in several other frame members 72 in the rear wheel portion 68 before entering one of the two angling members 72*b* of the rear frame portion 70. The exhaust pipe 32 proceeds to run longitudinally through the angling member 72*b*, exiting at the rear of the chassis 14 and opening to allow exhaust fumes to escape. Preferably, the distal end 32*c* of the exhaust pipe 32 extends through a distal end 72*d* of the angling member 72*b*, at the rear of the vehicle 10.

Preferably, the cross-sectional shape of exhaust pipe 32 is round as it leaves the engine 22 and extends through the center frame member 72*a*, changing to a substantially rectangular shape upon entering the angling member 72*b*. As shown in FIGS. 3-4, the angling members 72*b* are preferably substantially rectangular in shape, and are relatively shallow in depth, compared to the center frame member 72*a*. As used herein, a "substantially rectangular" frame member is any frame member with an inner cavity having a shape that is rectangular or nearly so. As described above, the angling members 72*b* have a "top-hat" section, but may alternately have any other substantially rectangular shape, including a C-section, I-section, box section, or similar shape. Accordingly, the end portion 32*a* of the exhaust pipe 32 preferably has a rectangular shape to fit closely with the angling member 72*b* it passes through, without extending below the bottom of the angling member 72*b*. This close fit with the large frame member 72*c* helps ensure the correct departure angle of the kick-up portion 81 is achieved. As described above, this departure angle increases the ground clearance of the rear frame portion 70 of the frame assembly 50, thereby allowing the vehicle 10 to traverse a steeper incline without damage. Alternately, the exhaust pipe 32 may pass through a different frame member 72. The exhaust pipe 32 or the frame member 72 through which the exhaust pipe 32 passes may have a different shape, but the shape of the end of the exhaust pipe 32 is preferably the same as, or similar to, the shape of the frame member 72 through which the exhaust pipe 32 runs. As an example, the frame member 72 and the exhaust pipe 32 may be oval or circular in shape. Further, the exhaust pipe 32 may have a shape that is not the same as the frame member 72. For example, the frame member 72 may be rectangular in cross-section, while the exhaust pipe 32 is circular or oval in shape, but wherein the exhaust pipe 32 is dimensioned to fit within the frame member 72. Still other variations are possible.

Figure 9:
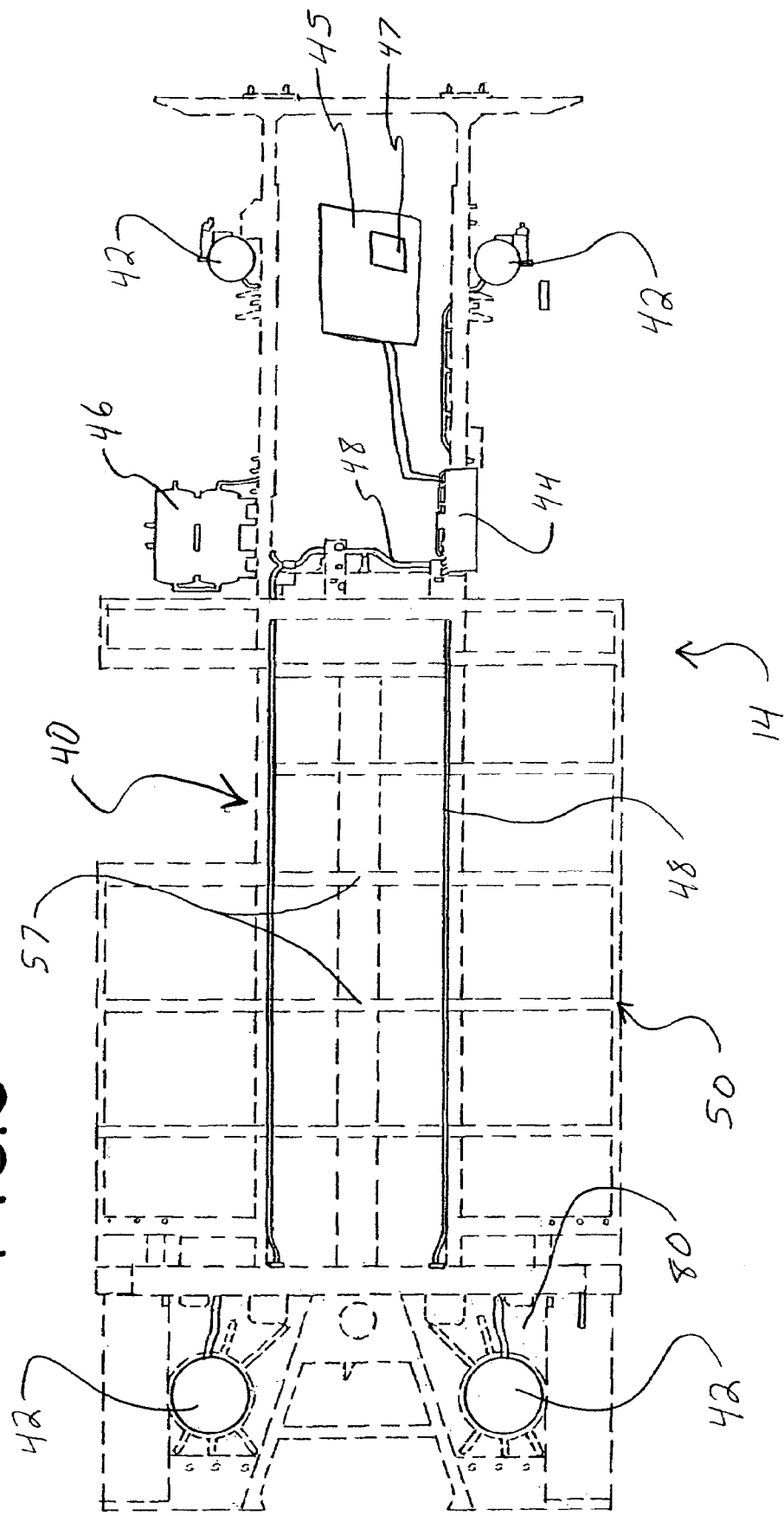
FIG. 9 is a bottom view of an air pressure system of one embodiment of a chassis assembly of the present invention, with a portion of a frame assembly of the chassis assembly shown in broken lines.
Figure 10:
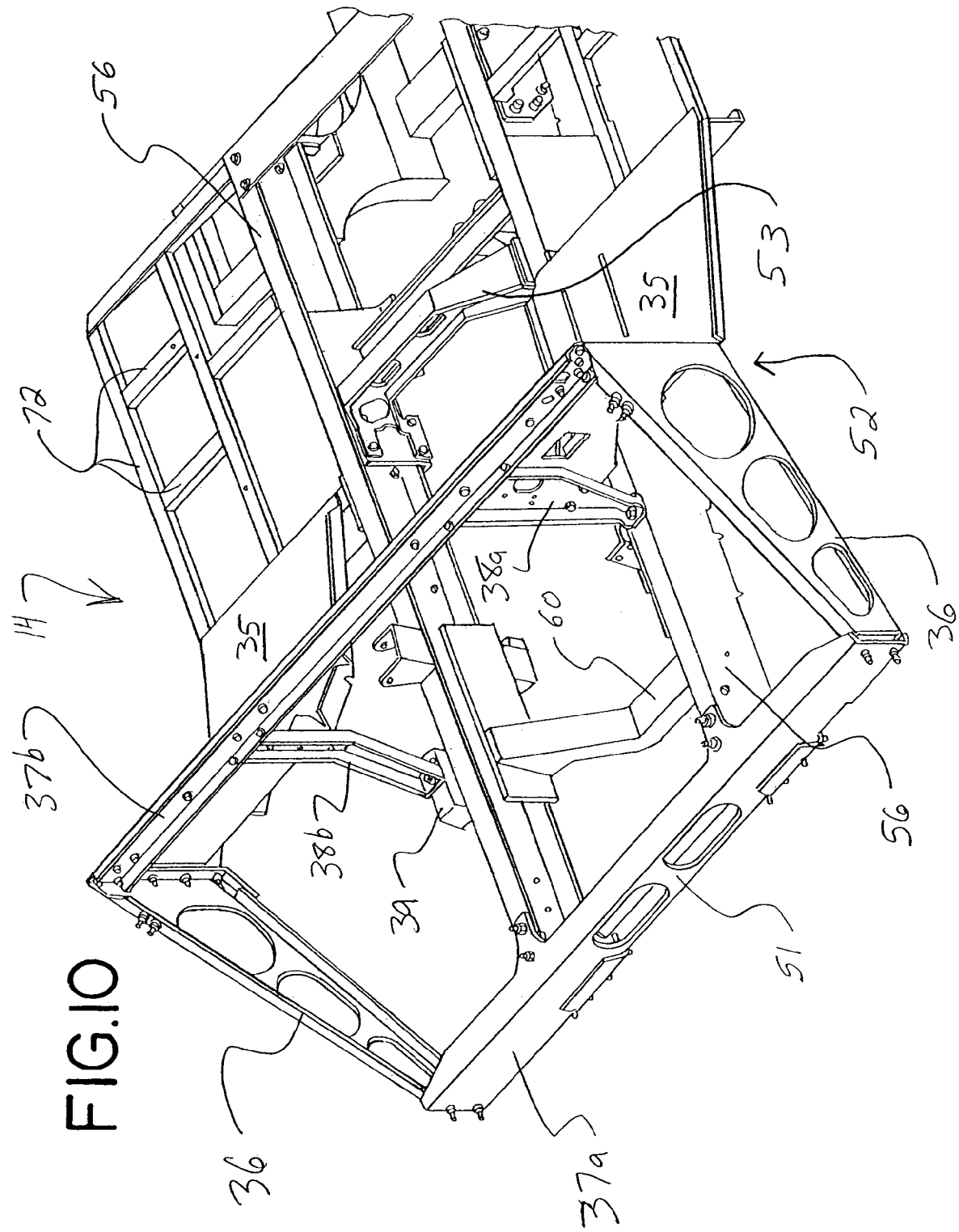
FIG. 10 is a perspective view of the front of one embodiment of the chassis assembly of the present invention.

The preferred suspension system 40, illustrated in FIGS. 6 and 9, includes an air compressor assembly 44, air tanks 46, four air bags 42 (one near each wheel 25) to support the frame assembly 50, and air lines 48 between the air compressor 44, the air tanks 46 and the air bags 42. The suspension system 40 may also be referred to as a leveling system. The wheels 25 at the front of the chassis 14 have air bags 42 in combination with leaf springs and shock absorbers for suspension. The wheels 25 at the rear of the chassis 14 have air bags 42 in combination with trailing arms and shock absorbers for suspension. The air pressure delivered to the air bags 42 can be used to adjust the height of the chassis 14 from the ground. The suspension system 40 also preferably incorporates a computerized control system 45 that controls pressure in each air bag 42 automatically, or when directed by an operator. The computerized control system 45 contains a CPU 47, among other components.

Figure 8:
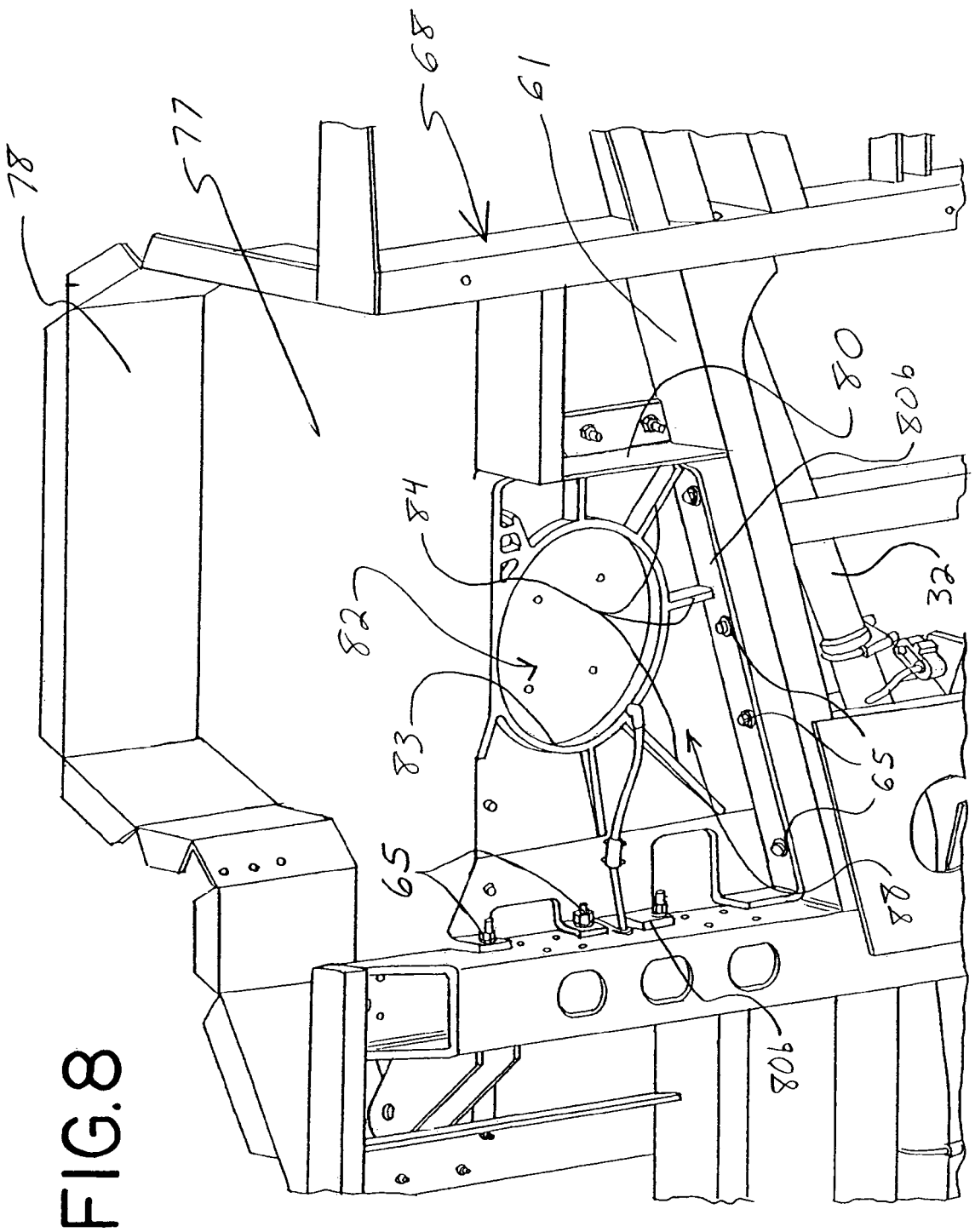
FIG. 8 is a bottom perspective view of a casting and a wheel arch of the chassis assembly of the present invention.

As shown in FIG. 6, the rear air bags 42 are preferably positioned between, and configured to abut, the castings 80 and moveable wheel supports 85 in the rear wheel portion 68 of the chassis assembly 14. In this arrangement, the inflation and deflation of the air bag 42 moves the wheel support 85 to raise and lower the chassis assembly 14. Accordingly, the castings 80 are preferably provided with a cavity 82 configured to receive a portion of an air bag 42 therein. As illustrated in FIGS. 8 and 14-15, the cavity 82 is preferably formed by an circular ridge 83 on the underside of the casting 80, and the top of the air bag 42 sits within the cavity 82, restricting lateral movement of the air bag 42. Additionally, the castings 80 are preferably provided with strengthening ribs 84 to provide increased resistance to bending and shear stresses created by the contact with the air bags 42. As illustrated in FIG. 8, the strengthening ribs 84 are preferably located on the underside of each casting 80, and arranged in a radial pattern to provide even strength and support over the entire casting 80. The creation of the circular ridge 83 and the strengthening ribs 84 is facilitated by the use of the casting process to create the castings 80. Alternately, the cavity 82 and/or strengthening ribs 84 may be created by structures affixed to the castings 80 via welding or other connection methods. Additionally, the cavity and/or strengthening ribs 84 may be arranged differently, or may not be present at all. Due to the great deal of stress that is concentrated on the castings 80, the increased strength of the castings 80 is particularly advantageous.

In the preferred embodiment, the suspension system 40 enables three different suspension levels, which are adjustable in response to operating circumstances and conditions. At the lowest, or kneeling, suspension level, the step height (H) of the chassis 14 is preferably 7 inches from the ground, and is used when the vehicle 10 is stopped for loading or unloading. At the middle suspension level, the step height (H) of the chassis 14 is preferably 9 inches, which is used for normal driving conditions. The chassis 14 may also be raised to a highest, or reverse-kneeling, suspension level, where the step height is preferably 11 inches. The highest level is useful in many circumstances, such as when driving slowly over rough or damaged roads. The computerized control system 45 controls the level at which the vehicle 10 operates, and can do so automatically or in response to manual direction. For example, the chassis 14 may be lowered to the kneeling level by a switch activated by the operator. Additionally, the computerized control system 45 may similarly be configured to automatically return the chassis 14 to the middle level when the vehicle 10 is placed in gear, or when it begins to move. Similarly, if the vehicle is at the highest level, the computerized control system may be configured to automatically return the chassis 14 to the middle level upon reaching a certain traveling speed. Still other variations and embodiments exist.

Additionally, due to uneven loading or other conditions, the chassis 14 may lean to one side or the other. It is preferable that the plane of the chassis 14 is level with the ground. Accordingly, the computerized control system 45 automatically detects whether the chassis 14 is level to the ground and adjusts the air pressure in the air bags 42 to change the plane of the chassis assembly 14 if necessary.

Various connections between frame members 72 and other components of the chassis assembly 14 are described herein. It is understood that these connections may be accomplished by any method known in the art or described herein. Such methods for connection include bolting, welding, fusion, bonding, brazing, casting, molding, clamping, and other similar methods.

As discussed, the chassis assembly 14 of the present invention provides several benefits. Advantageously, the chassis assembly 14 can be delivered as a one-piece chassis, ready to receive an appropriate body for its desired application, without further assembly by the customer. The grid structure of the frame assembly 50 provides a low-profile chassis assembly 14, preferably in which the step height (H) is lower than the height (H') of the rotational axes 33 of the wheels 25. This, in turn, allows the floor of the vehicle to be closer to the roadway. For a passenger vehicle, such as a bus or an ambulance, the low floor permits easier entrance and exit from the vehicle. In the case of an ambulance, equipment such as wheelchairs and gurneys can be more easily loaded and unloaded from the vehicle. In the case of a bus or other passenger vehicle, elderly or handicapped passengers are better able to enter and exit the vehicle due to the low height. For a cargo vehicle, the low floor height enables easier loading and unloading of the vehicle. Additionally, the low floor allows for the top of the vehicle to be lower and increasing clearance while maintaining the same storage volume. Alternately, the low floor allows for greater storage volume, if the top of the vehicle is kept the same height.

The chassis assembly 14 includes other advantages, as well. The kick-up portion 81 permits the vehicle 10 to be driven on an incline without the rear of the chassis 14 scraping the ground, particularly when the chassis 14 is loaded onto a transport vehicle (not shown) by use of a ramp. This, in turn, permits the chassis 14 to be more easily delivered to a vehicle-assembly plant in one piece. The use of the kick-up portion is particularly beneficial to a chassis assembly having a low step height, such as the present chassis assembly 14. The rectangular cross-section of the exhaust pipe 32 allows for reduced dimensions of the exhaust pipe 32. This reduced dimension permits the exhaust pipe 32 to follow the required departure angle of the kick-up portion 81. The rectangular exhaust pipe 32 further enhances clearance of the chassis assembly, as opposed to if a similar sized exhaust pipe 32 of circular cross-section was used. The castings 80 and connection structures to the wheel arches 78 provide enhanced structural rigidity. Since a great deal of force is concentrated at the castings 80, prior art plates used for this purpose experienced bulging and other defects and failures. Thus, the improved strength of the castings 80 relative to prior art plates and other structures is particularly advantageous. Other frame members provide additional enhanced strength. The exhaust pipe 32 can be mounted in an enhanced configuration based on the frame assembly 50 configuration. Use of the CV joint 28 provides an enhanced connection between the transmission and transfer case. Other benefits are understood from the above description of the chassis assembly 14.

While the specific embodiments have been illustrated and described, numerous modifications come to mind without significantly departing from the spirit of the invention, and the scope of protection is only limited by the scope of the accompanying Claims.

What is claimed is:

1. A casting adapted to be connected to a vehicle chassis assembly comprising a plurality of frame members, the casting comprising:
   a cast plate having a top side and an underside;
   a cavity on the underside of the cast plate adapted to receive a portion of a suspension system therein, wherein the cavity is defined by a circular ridge on the underside of the cast plate, at least a portion of the circular ridge being spaced inwardly from an outer edge of the cast plate; and
   a first flange adapted to be connected to a first frame member of the vehicle chassis assembly, such that the cast plate is fixed against movement with respect to the chassis assembly.

2. The casting of claim 1, wherein the flange is integral with the plate.

3. The casting of claim 1, further comprising a plurality of strengthening ribs on the underside of the cast plate, at least one of the strengthening ribs extending from the circular ridge toward the outer edge of the cast plate.

4. The casting of claim 1, wherein the vehicle chassis assembly further comprises a wheel arch, and the casting is adapted to be connected to the wheel arch.

5. The casting of claim 1, wherein the casting further comprises a second flange adapted to be fixedly connected to a second frame member of the vehicle chassis assembly.

6. The casting of claim 5, wherein the first flange extends from the plate in a horizontal direction and the second flange extends from the plate in a vertical direction.

7. The casting of claim 5, wherein the first flange extends horizontally from the top side of the plate and the second flange extends vertically from the underside of the plate.

8. The casting of claim 1, further comprising a strengthening rib on the underside of the cast plate, the strengthening rib extending from the circular ridge to the outer edge of the cast plate.

9. A vehicle chassis assembly comprising:
- a frame assembly comprising a plurality of frame members;
- a wheel arch connected to the frame assembly and extending above a top surface of the frame assembly; and
- a cast plate having a planar top side forming a portion of the top surface of the frame assembly, the cast plate being directly connected to the wheel arch and directly connected to a frame member so that the cast plate is fixed against movement with respect to the wheel arch and the frame member, wherein the cast plate has an underside opposite the top side, and further comprises a cavity on the underside of the cast plate receiving an airbag of a suspension system therein, wherein the cavity is defined by a circular ridge on the underside of the cast plate, at least a portion of the circular ridge being spaced inwardly from an outer edge of the cast plate.

10. The vehicle chassis assembly of claim 9, further comprising:
- a second wheel arch connected to the frame assembly and extending above the top surface of the frame assembly; and
- a second cast plate having a planar top side forming a portion of the top surface of the frame assembly, the second cast plate being directly connected to a second wheel arch and directly connected to a second frame member.

11. The vehicle chassis assembly of claim 10 wherein the suspension system further comprises a second air bag abutting the second cast plate.

12. The vehicle chassis assembly of claim 9, wherein the cast plate is connected to the wheel arch and the frame member via bolted connections.

13. The vehicle chassis assembly of claim 9, wherein the cast plate further comprises a flange having bolt holes for bolting to the frame member.

14. The vehicle chassis assembly of claim 9, wherein the cast plate further comprises a first horizontally-extending flange having bolt holes for bolting to a horizontal surface of the frame member and a second vertically-extending flange having bolt holes for bolting to a vertical surface of a second frame member.

15. The vehicle chassis assembly of claim 9, further comprising a wheel supporting the frame assembly and positioned beneath the wheel arch, the wheel having a rotational axis, the rotational axis being located above the top surface of the frame assembly.

16. The vehicle chassis assembly of claim 9, wherein the frame members define a first frame portion and a rear frame portion angling upwardly with respect to the first frame portion.

17. The vehicle chassis assembly of claim 9, wherein the wheel arch is removable from the chassis assembly.

18. The vehicle chassis assembly of claim 9, wherein the frame assembly has an angling frame member, and the cast plate has an angling edge abutting the angling frame member.

19. The vehicle chassis assembly of claim 9, wherein the plate and the wheel arch are located proximate a rear of the chassis assembly.

20. The vehicle chassis assembly of claim 9, further comprising a first flange extending horizontally from the cast plate and fixedly connected to a horizontal top surface of the frame member, and a second flange extending vertically from the cast plate and fixedly connected to a vertical side surface of another frame member.

21. A vehicle chassis assembly comprising:
- a frame assembly adapted to support a vehicle body on a top side thereof, the frame assembly comprising:
  - an elevated front frame portion comprising a plurality of frame members defining a platform and a front wheel supporting the front frame portion;
  - a middle frame portion having a top surface on the top side of the frame assembly and comprising a plurality of frame members, a rear wheel supporting the middle frame portion, and a wheel arch positioned over the rear wheel;
  - a neck portion connecting the front frame portion and the middle frame portion; and
  - a rear frame portion connected to the middle frame portion and comprising a plurality of frame members;
- a suspension system connected to the frame assembly; and
- a casting fixedly connected to the wheel arch, a first frame member, and a second frame member, the casting comprising:
  - a cast plate having a top side and an underside opposite the top side, the top side of the cast plate being substantially flush with the top surface of the middle frame portion;
  - a cavity on the underside of the plate, receiving a portion of the suspension system therein;
  - a first flange extending horizontally from the cast plate and fixedly connected to a horizontal top surface of the first frame member; and
  - a second flange extending vertically from the cast plate and fixedly connected to a vertical side surface of the second frame member,
  - wherein the casting is fixed against movement with respect to the frame assembly.

* * * * *